Jan. 16, 1962  N. EBELING  3,016,891
SPEAR GUN
Filed Dec. 9, 1958  3 Sheets-Sheet 1
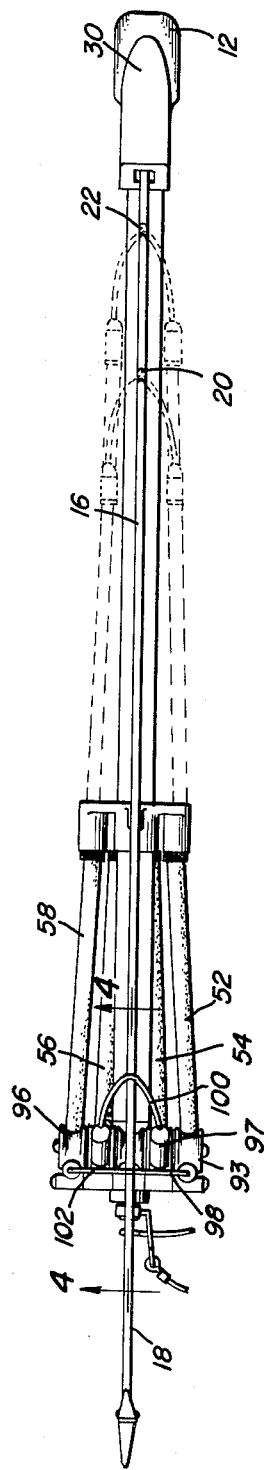
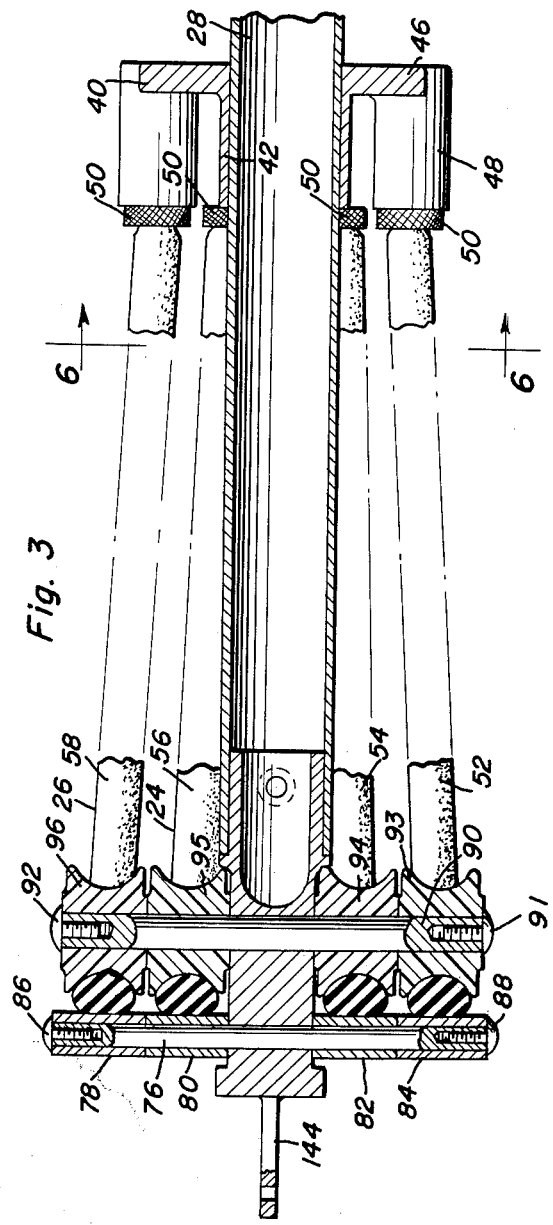
Norbert Ebeling
INVENTOR.
BY *Clarence A. O'Brien*
*and Harvey B. Jacobson*
Attorneys

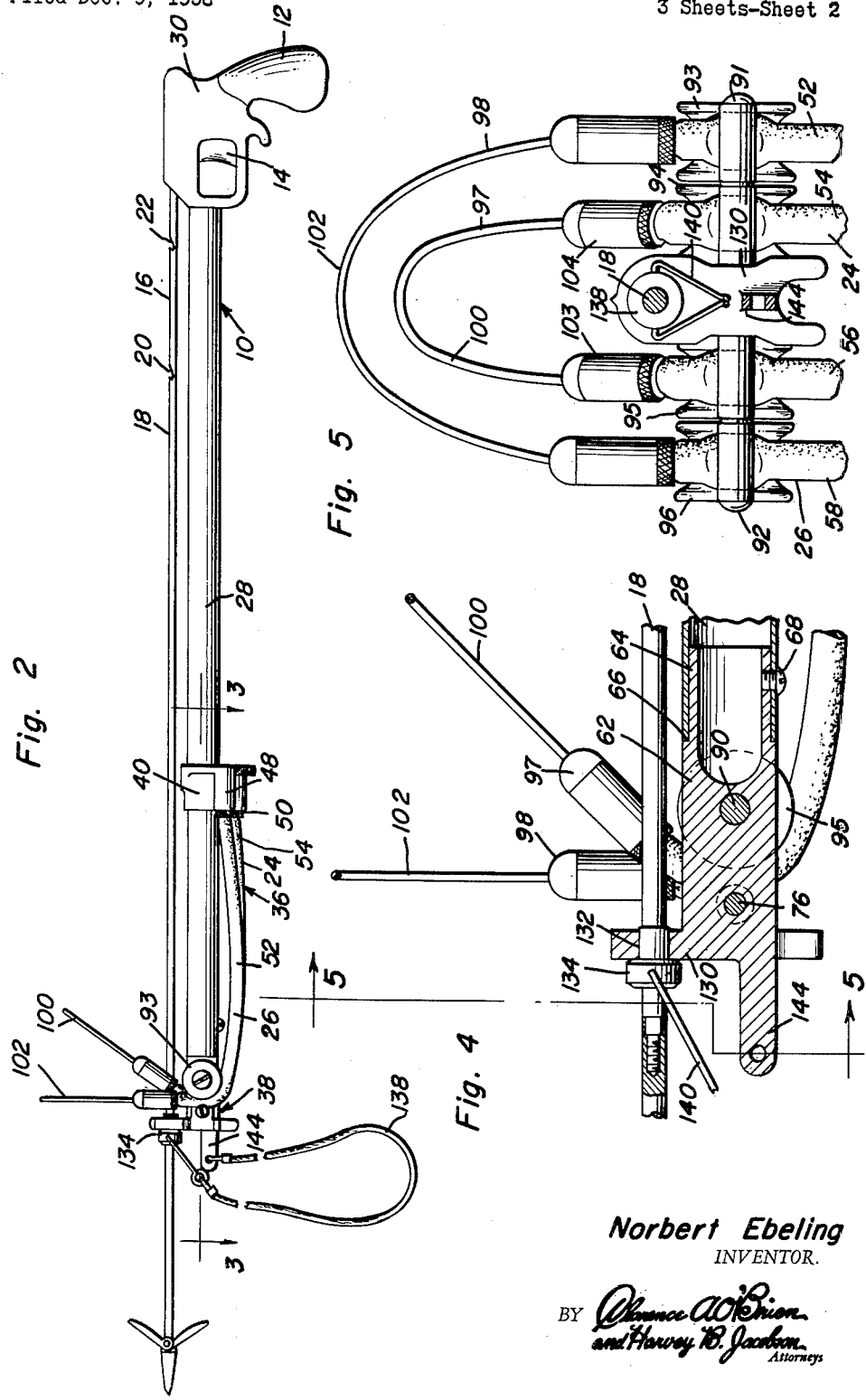

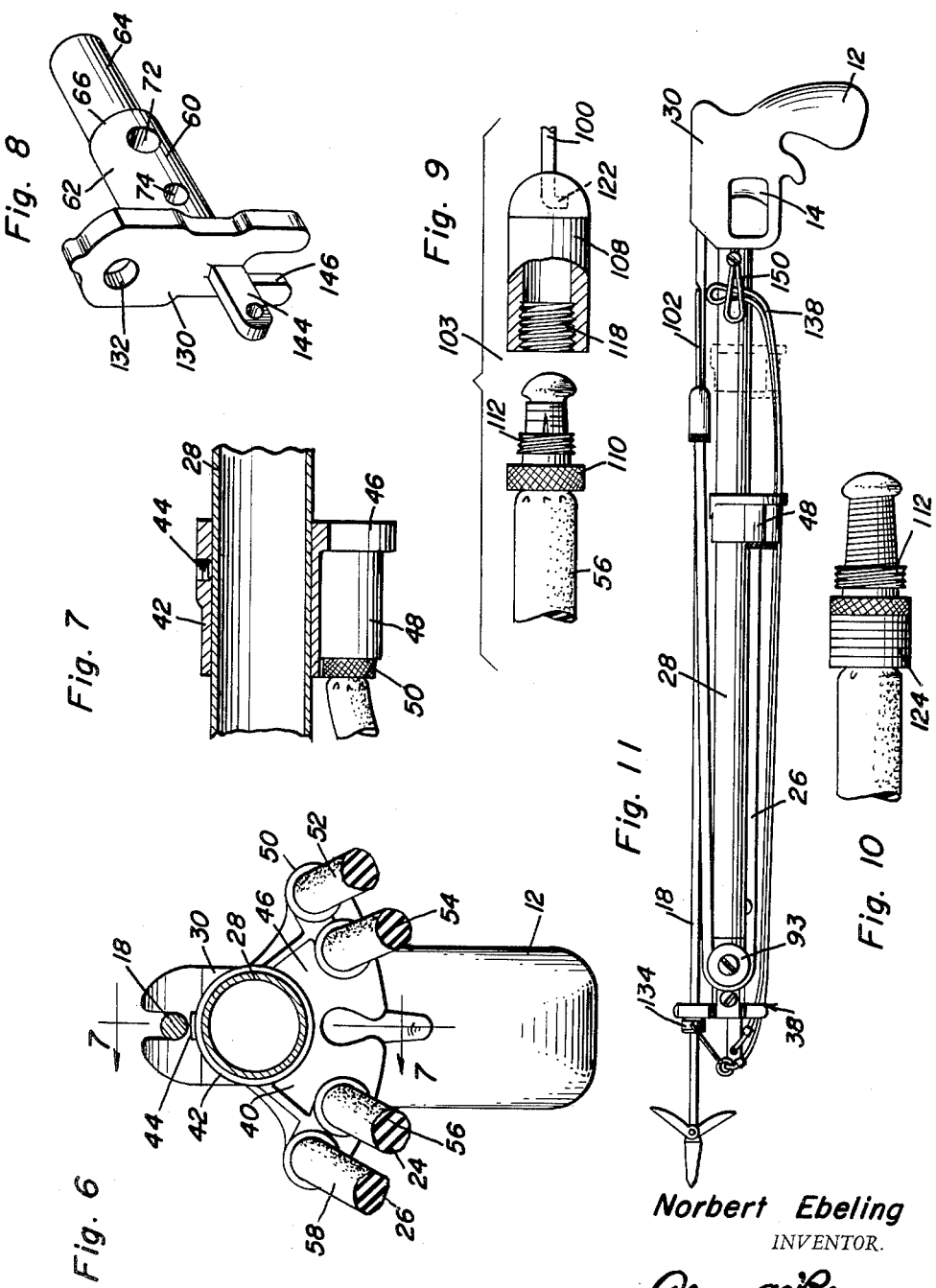

United States Patent Office 3,016,891
Patented Jan. 16, 1962

3,016,891
SPEAR GUN
Norbert Ebeling, 109 N. Oxford, Tulsa, Okla.
Filed Dec. 9, 1958, Ser. No. 779,246
8 Claims. (Cl. 124—22)

This invention relates to guns and more particularly to improvements in spear guns of the type using external rubber elastics for power.

An object of the invention is to provide new and useful improvements in spear guns, especially embodied in a modified muzzle allowing the gun to be shortened to a compact length. Simple adjustment of the elastics to within their capacity considerably increases the power of a gun having the new muzzle thereon over the original unmodified gun.

In many inland states where spear fishing is permitted, underwater visibility is often restricted to a few feet and frequently the muzzle end of a standard length gun is not visible. A shorter gun is desired under these conditions. Yet, it is not possible to sacrifice the power necessary to project the spear since the penetrating capability would then be limited to smaller fish. Some fish, for instance catfish in certain parts of this country, weigh more than one hundred pounds. The use of a short, powerful gun is essential. Gas powered guns have not proved practical due to the muddy lakes that the catfish occupy, river bottoms and other bodies of water. Furthermore, spear shafts are frequently bent.

This invention provides, among other improvements in spear guns, a roller type muzzle possessing several advantages and features enabling an ordinary spear gun to be reduced in length and yet preserve and in some instances, increase the power of the spear gun.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top view of a spear gun constructed in accordance with the invention.

FIGURE 2 is a side view of the spear gun in FIGURE 1.

FIGURE 3 is an enlarged sectional view taken on the line 3—3 of FIGURE 2 and showing the improved muzzle.

FIGURE 4 is a sectional view taken on the line 4—4 of FIGURE 1 and showing further details of the muzzle.

FIGURE 5 is a sectional view taken on the line 5—5 of FIGURE 4.

FIGURE 6 is a sectional view taken on the line 6—6 of FIGURE 3.

FIGURE 7 is an enlarged sectional view taken on the line 7—7 of FIGURE 6.

FIGURE 8 is a perspective view of a part of the muzzle frame.

FIGURE 9 is an exploded elevational view, parts shown in section, of a part of the wishbone assembly for the elastics.

FIGURE 10 is a modification of the wishbone assembly showing protective rubber wrapping and discs to avoid a possible source of damage to the elastic.

FIGURE 11 is a side view of the spear gun in the cocked position.

In the accompanying drawings there is a spear gun 10 which has been improved by the application of means by which to enable the length of the spear gun to be reduced without the sacrifice of power. Gun 10 has a number of conventional parts, some of which are not shown in detail. The gun 10 has a handgrip 12, a trigger 14 which operates a sear (not shown) to release the spear 16. The spear has a spear shaft 18 provided with two notches 20 and 22 inasmuch as the ilustrated gun is to be used with a double power sling assembly, including two power slings 24 and 26. The principles of the invention are equally applicable with spear guns using a single power sling or a triple power sling. Shortened gun frame 28 extends forwardly from the handle grip and trigger containing body 30 of the gun, and the novel muzzle is connected with it. The muzzle 36 has an end assembly 38 and a sling holder 40 located at a selected position along the length of body 28 which is usually a hollow tube. The sling holder (FIGURES 3 and 6) is made of a sleeve 42 that is slidable on body 28 and held in a selected position along the length of the body by setscrew 44 or some other fastener suitable for this purpose. Flange 46 is integral with or otherwise held fixed to the inner end of sleeve 42 and has a plurality of sockets 48 rigidly attached to it. The sockets receive and hold the inner ends of the slings 24 and 26 by means of conventional ferrule clamps 50. Since the illustrated gun is for a double sling, there are four sockets 48 since sling 24 has two elastics 56 and 54, while sling 26 has two elastics 52 and 58. Sling holder 40 has its sockets 48 located below frame 28 (FIGURE 2).

End assembly 38 has a muzzle frame 60 (FIGURE 8) constructed of a cylindrical body 62 having a reduced end 64 with a shoulder 66 separating the reduced end from the remainder of the body. The reduced end 64 of the muzzle frame 60 is inserted in the open outer end of the shortened frame 28 and held in place in a position at which shoulder 66 abuts the extremity of frame 28 by a standard fastener, for instance screw 68. There are two transverse passages 72 and 74 in body 62. Spindle 76 extends through the forward passage 74 and has four rollers 78, 80, 82 and 84 confined thereon, two on each side of body 62, by bolts 86 and 88 threaded in the ends of spindle 76. Rollers 78, 80, 82 and 84 are small diameter rollers which may be constructed of sleeves on spindle 76. Spindle 90 is passed through passage 72 and has roller confining bolts 91 and 92 threaded in the ends thereof and holding rollers 93, 94, 95 and 96 confined on the spindle 90. Pairs of the rollers consisting of one roller on each spindle, oppose each other and have the elastics of the slings 24 and 26 between them. Rollers 93, 94, 95 and 96 are grooved and made of lightweight material, for instance nylon, "Micarta" or some other synthetic substance or non-synthetic substance which is light in weight.

The outer end of each sling has a wishbone assembly attached thereto. There are two wishbone assemblies 97 and 98. The inner wishbone assembly 97 is connected to the adjacent elastics 54 and 56, and the outer wishbone assembly 98 (FIGURE 1) is attached to the outer elastics 52 and 58 of the two slings. The wishbone assemblies are identical. Loop 100 has two clamps 103 and 104 connected to its ends and connected to the ends of elastics 54 and 56. Clamp 103 is made of a socket 108. Loop 100 has an angulated end 122 within the socket and ferrule is a standard item with the ferrule having a threaded part 112 engaging the threads 118 of 108. Loop 100 has an angulated end 122 within the confines of socket 108, being passed through an opening in the end wall of the socket so that the loop is swivelly attached to the socket. As an improvement over this construction (FIGURE 10), a plurality of soft rings, for instance rubber rings 124 are attached over a part of the ferrule to prevent cuts in the elastic.

Frame 62 has a plate 130 at its outer end. There is an opening 132 in the top part of the plate 130 in which to accommodate slide ring 134 (FIGURE 4). The slide ring is hollow so that the spear shaft 18 may pass there-through in the usual way. The slide ring, as is customary, is held onto the spear shaft when the spear shaft is shot. A shoulder (not shown) on the inner extremity of the spear shaft engages the slide ring 134, propelling it with the spear. A lightweight but very strong cord 138 is attached by wire connector 140 to the slide ring 134, and is attached to a forwardly extending bracket 144 having an aperture for this purpose, and fixed to the plate 130. Cord or line guide, downwardly opening recess 146, is in plate 130 beneath bracket 144.

In cocking the gun the inner sling is attached by loop 100 in notch 20, to the spear. The outer sling 26 is attached by loop 102 engaging notch 22, to the spear shaft 18. This stretches the elastics of the slings around the larger diameter rollers. When the spear is fired the elastics of the slings move rapidly between the rollers on the parallel adjacent spindles 76 and 90 and are compressed therebetween as shown in FIGURE 3. The front rollers 78, 80, 82 and 84 act as a stop for the power slings and also help to reduce the momentum of the wishbone assemblies by squeezing the elastics between the rollers. This is possible with no loss in power for this reason: when the elastics are in the stretched condition, they reduce in diameter very materially. Therefore they are capable of freely moving in the spaces between rollers of the pairs of rollers at the end assembly of the muzzle 36. When they deliver their stored energy to the shaft of the spear in a direction to propel the spear, they are still rather small in diameter or at least, small enough to pass quite freely in the spaces between the rollers. But, as they enlarge in diameter, returning to normal size they become clamped in-between the rollers of the pairs of rollers.

The actual propulsion of the spear is the same as in an ordinary gun, to the extent that the spear is shot forcibly from the gun. However the gun length may be made shorter for a given power requirement by the use of the muzzle 36. As soon as the slide ring 134 is discharged from opening 132 and with the spear, line 138 is pulled from line holder 150 at the frame 30 of the gun. The line holder is made of a spring wire loop attached to the inner extremity of frame 28 and cooperating with a part of the surface of frame 28 to form a clamp for the line 138. The spear, after having been shot, is recoverable in the usual way.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a spear gun which has a comparatively short frame and means connected with the frame to hold and release a spear, the improvement comprising a muzzle having a sling holder, means for adjustably mounting said sling holder at selected places along the length of said frame, and an end assembly attached to the outer end of the frame, said sling holder adapted to hold at least one sling having a pair of elastics, said end assembly having at least two rollers over which the elastics of the sling are passed, a wishbone assembly attached to said elastics and adapted to engage in a notch in the spear shaft, and means connected with said end assembly and located adjacent to said pair of rollers for compressively engaging said elastics and decelerating the latter and the wishbone assembly of said sling when said sling is being returned from a stretched condition to an unstretched condition, said decelerating means comprising a spindle parallel to the axis of rotation of said pair of rollers having forward rollers thereon transversely spaced from said first mentioned rollers a distance greater than the diameter of said elastics when in a stretched condition and less than the diameter of said elastics being returned from a stretched condition to an unstretched condition.

2. In a spear gun which has a comparatively short frame and means connected with the frame to hold and release a spear, the improvement comprising a muzzle having a sling holder, means for adjustably mounting said sling holder at selected places along the length of said frame, an end assembly attached to the outer end of the frame, said sling holder adapted to hold at least one sling having a pair of elastics, said end assembly having at least two rollers over which the elastics of the sling are passed, a wishbone assembly attached to said elastics and adapted to engage in a notch in the spear shaft, means connected with said end assembly and located adjacent to said pair of rollers compressively engaging said elastics and decelerating the latter and the wishbone assembly of said sling when said sling is being returned from a stretched condition to an unstretched condition, said decelerating means including a spindle parallel to the axis of rotation of said pair of rollers, forward rollers on said spindle and transversely spaced from the first mentioned rollers a distance greater than the diameter of the elastics when in a stretched condition and less than the diameter of the elastics when in an unstretched condition, the elastics of said sling adapted to pass between the spaces of said spaced rollers.

3. The combination of claim 2, wherein said end assembly also has a muzzle frame, means attaching said muzzle frame to the spear gun frame and at the forward extremity thereof, said muzzle frame provided with an end plate having an aperture, a slide ring separably mounted in said aperture and through which the spear is adapted to pass, a line attached to said slide ring, and means associated with said plate for attaching said line to said muzzle frame.

4. The improvement in claim 2, wherein said wishbone assembly has a loop with sockets at the ends thereof, ferrules at said ends of said elastics and attached thereto, means removably securing said ferrules in said sockets, and means forming a covering over at least exposed portions of said elastics immediately adjacent said ferrules, said covering being of soft material to prevent the elastics from being cut by the ends of said ferrules adjacent said exposed portions.

5. In a spear gun which has a comparatively short frame, a muzzle assembly comprising a sling holder attached to said frame, an end assembly, means fastening said end assembly to the outer end of said frame, at least one sling having a pair of elastics attached at their inner ends to said sling holder, a wishbone assembly attached to the outer ends of said elastics, said end assembly having a frame, means on said frame compressively engaging said elastics when the elastics are in the unstretched condition and when the elastics are approaching the unstretched condition from the stretched condition for decelerating the movement of the elastics and said wishbone assembly, the decelerating means comprising a pair of grooved rollers at the inner part of said end assembly, and a spindle located in spaced relationship to said grooved rollers and forwardly thereof, said spindle and roller spacing providing a passageway through which said elastics are passed, rollers on said spindle and opposing the grooved rollers and against which the elastics are adapted to engage when returning to said unstretched condition and spaced from said grooved rollers a distance greater than the diameter of said elastics when in a stretched condition and less than the diameter of said elastics when being returned from a stretched condition to an unstretched condition, a line, means at one end of said line for connecting the line to a spear, and means for connecting the opposite end of said line to said end assembly.

6. The combination of claim 5, wherein there is a line guide in said end assembly through which the line is adapted to pass, and a line clamp carried by the gun to hold the line separably attached at an intermediate part of the line to the gun.

7. In a spear gun having a short frame and means connected with the frame to hold and release a spear, a muzzle having a sling holder, an end assembly attached to the outer end of the frame, said sling holder adapted to hold at least one sling having a pair of elastics, said end assembly including guide means for slidably receiving and laterally deflecting said elastics, means on the end of said elastics remote from said sling holder adapted to engage in a notch in a spear shaft, said slidably receiving means including means for compressively engaging said elastics and decelerating the latter in passing through said guide means, said guide means including confronting surfaces between which said elastics are slidably received, said confronting surfaces being spaced apart a distance greater than the diameter of said elastics when in a stretched condition and less than the diameter of said elastics when being returned from a stretched condition to an unstretched condition.

8. In a spear gun having a short frame and means connected with the frame to hold and release a spear, a muzzle having a sling holder, an end assembly attached to the outer end of the frame, said sling holder adapted to hold at least one sling having a pair of elastics, said end assembly including guide means for slidably receiving and laterally deflecting said elastics, means on the end of said elastics remote from said sling holder adapted to engage in a notch in a spear shaft, said slidably receiving means including means for compressively engaging said elastics and decelerating the latter in passing through said guide means, said guide means including a pair of rollers over which the elastics of the sling are passed, and a spindle parallel to the axis of rotation of said pair of rollers having forward rollers thereon transversely spaced from the first mentioned rollers a greater distance than the diameter of said elastics when in a stretched condition and less than the diameter of said elastics when being returned from a stretched condition to an unstretched condition.

References Cited in the file of this patent

UNITED STATES PATENTS

| | | |
|---|---|---|
| 313,413 | Elsey | Mar. 3, 1885 |
| 655,170 | Markham | July 31, 1900 |
| 2,301,789 | Pearson | Nov. 10, 1942 |
| 2,504,525 | Holderness | Apr. 18, 1950 |
| 2,600,883 | King | June 17, 1952 |
| 2,818,849 | Woods | Jan. 7, 1958 |
| 2,839,862 | Hanshaw | June 24, 1958 |
| 2,852,015 | Logan | Sept. 16, 1958 |
| 2,869,273 | Thorburn | Jan. 20, 1959 |

FOREIGN PATENTS

| | | |
|---|---|---|
| 910,495 | France | Feb. 4, 1946 |
| 475,184 | Italy | Oct. 17, 1952 |
| 477,810 | Italy | Feb. 9, 1953 |